(12) United States Patent
Weis

(10) Patent No.: US 6,714,518 B1
(45) Date of Patent: Mar. 30, 2004

(54) METHOD FOR SETTING UP A CONNECTION IN A SYNCHRONOUS DIGITAL TELECOMMUNICATIONS NETWORK AND NETWORK ELEMENT

(75) Inventor: Bernd Weis, Korntal-Münchingen (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/233,124

(22) Filed: Jan. 19, 1999

(30) Foreign Application Priority Data

Jan. 20, 1998 (DE) .......................................... 198 01 875

(51) Int. Cl.$^7$ ........................... G01R 31/08; H04J 3/16; H04J 3/02
(52) U.S. Cl. .......................... 370/248; 370/468; 370/541
(58) Field of Search ............................... 370/216, 227, 370/242, 244, 248, 252, 254, 256, 404, 466, 539, 541, 537, 223, 468, 396; 709/220, 223, 224; 379/219, 221.04; 340/3.43

(56) References Cited

U.S. PATENT DOCUMENTS

| | | | | |
|---|---|---|---|---|
| 5,495,471 A | * | 2/1996 | Chow et al. | 370/16 |
| 5,548,639 A | * | 8/1996 | Ogura et al. | 379/221 |
| 5,815,490 A | * | 9/1998 | Lu | 370/223 |
| 5,884,017 A | * | 3/1999 | Fee | 395/182.02 |
| 6,052,722 A | * | 4/2000 | Taghadoss | 709/223 |
| 6,256,292 B1 | * | 7/2001 | Ellis et al. | 370/227 |

OTHER PUBLICATIONS

D Johnson et al.: "Distributed restoration in telecommunications networks"(BT Technol. J. vol. 12 No. 2, Apr. 1994, pp. 67–76).
ITU–T Recommendations G.707 (3/96) Series G: Transmission Systems and Media, Digital transmission systems–Terminal equipments–General, "Network node interface for the synchronous digital hierarchy". pp. i–viii ; 1–129.

* cited by examiner

Primary Examiner—Duc Ho
(74) Attorney, Agent, or Firm—Sughrue Mion, PLLC

(57) ABSTRACT

A connection is set up between a sending and a selected network element of a digital synchronous telecommunications network without the help of a central management system. The telecommunications network is logically structured based on a hierarchy with at least two multiplex layers based on a protocol that is used in the telecommunications network with each network element being able to access at least a part of the multiplex layers. Using a broadcast that is being sent by the sending network element to all other network elements, possible paths with free transmission capacity are identified between the sending and the selected network element. To this end, first the most suitable multiplex layer for setting up the connection is selected. Then the broadcast is relayed via existing connections of the suitable multiplex layers, which the respective relaying network element can access. Then the connection is set up via one of the identified paths.

16 Claims, 4 Drawing Sheets

METHOD FOR SETTING UP A CONNECTION IN A SYNCHRONOUS DIGITAL TELECOMMUNICATIONS NETWORK AND NETWORK ELEMENT

This application is based on and claims the benefit of German Patent Application No. 198 01 875.4 filed Jan. 20, 1998, which is incorporated by reference herein

BACKGROUND OF THE INVENTION

The invention describes a method for setting up a connection between a sending and a selected network element of a digital telecommunications network in accordance with the preamble of claim 1 as well as a network element in accordance with claim 16.

The article "Distributed restoration in telecommunications networks" by D. Johnson et al. (BT Technol. J. Vol. 12 No. 2, April 1994, pp 67–76) describes a method for the distributed restoration of connections in a telecommunications network that works based on the recommendations for SDH (synchronous digital hierarchy). The article describes how a connection between a sending and a selected network node is set up without the interference of a central management system. To this end a so-called "flood search" is carried out in order to automatically identify alternative paths in a network after a connection or a network node fails. Each network node has a unique identification number (NID). If a physical connection between two network nodes fails, the network node with the lower NID becomes the sending network node and the other one the selected node. The sending network node now transmits the NID of the selected network node into a signature target field via all its back-up line systems, i.e. it signals the NID of the selected network node to its adjacent network node as the target signature. The adjacent network nodes continue to relay the target signature. If such a target signature reaches the selected network node, this means that there is a back-up path for restoring the failed connection. Now the selected network node sends a confirmation via the back-up path that was identified in this manner. Due to this confirmation, a physical connection is switched in all transit network nodes on the back-up path.

The article also mentions that in addition to using this distributed method for finding a path for restoring failed connections, it can also be used for other applications such as for switching a connection following a user request, for monitoring the network and for preventing overloads. In doing so, it also is possible to calculate a weight factor that takes the load of network nodes and connections into consideration in order to determine call metering.

The customary method is disadvantageous in that the free transmission capacity in the network is not used optimally since the signaling process is only possible between adjacent network nodes, i.e. only transmission capacity on the physical level between adjacent network elements is available as a back-up system for setting up a new connection. Another disadvantage is the fact that the path that is found must be retraced through a confirmation since it is not known per se even after the selected network node has received the target signature. Another disadvantage may be the fact that time may pass between the identification of possible paths and the switching of the connection. This means that a path that was identified in the meantime is assigned again by the time the selected network element sends back the confirmation and that consequently the connection cannot be set up. In addition, the customary method does not support protected connections and point-to-multipoint connections.

SUMMARY OF THE INVENTION

One object of the invention is to provide a method for setting up a connection in a synchronous digital telecommunications network that uses the free transmission capacity of the network better. Another object of the invention is to provide a network element that is suitable for carrying out the method.

The present invention provides a method and a network element for setting up a connection between a sending network element and a selected network element of a digital synchronous telecommunications network without the help of a central management system. The telecommunications network is logically structured based on a hierarchy with at least two multiplex layers based on a protocol that is used in the telecommunications network with each network element being able to access at least a part of the multiplex layers. Using a broadcast that is being sent by the sending network element to all other network elements, possible paths with free transmission capacity are identified between the sending and the selected network element. To this end, first the most suitable multiplex layer for setting up the connection is selected. The broadcast is relayed via existing connections of the suitable multiplex layers, which the respective relaying network element can access, and the connection is set up via one of the identified paths.

The invention is advantageous in that compared to the customary, central connection set-up, connections are established automatically and quickly. This allows for better customer service. The invention also restores failed connections faster. Another advantage is the fact that it is possible to react quickly to the changing load of the network, for example through ATM traffic.

Another advantage is the fact that the network load is reduced with the help of control data, so-called overhead.

Another advantage is the fact that the invention allows for a connection set-up based on the auto-dial of a user (customer), for example, by requesting the connection via the Internet or the World Wide Web (WWW). In addition, the method in accordance with the invention allows for a simpler connection set-up between two or several different network drivers or between different subnetworks.

Another advantage of the present invention is that it ensures that a path that is identified as suitable for setting up a connection is in fact available and is not used for a different purpose in the meantime.

By calculating a cost parameter as described in sub-claim 11, it is advantageously ensured that the most inexpensive or the most suitable path based on load can be used for setting up the connection.

BRIEF DESCRIPTION OF THE DRAWING

In the following paragraphs the invention is described with the help of FIGS. 1–6 and two exemplary embodiments.

DETAILED DESCRIPTION OF THE INVENTION

Figure 1:
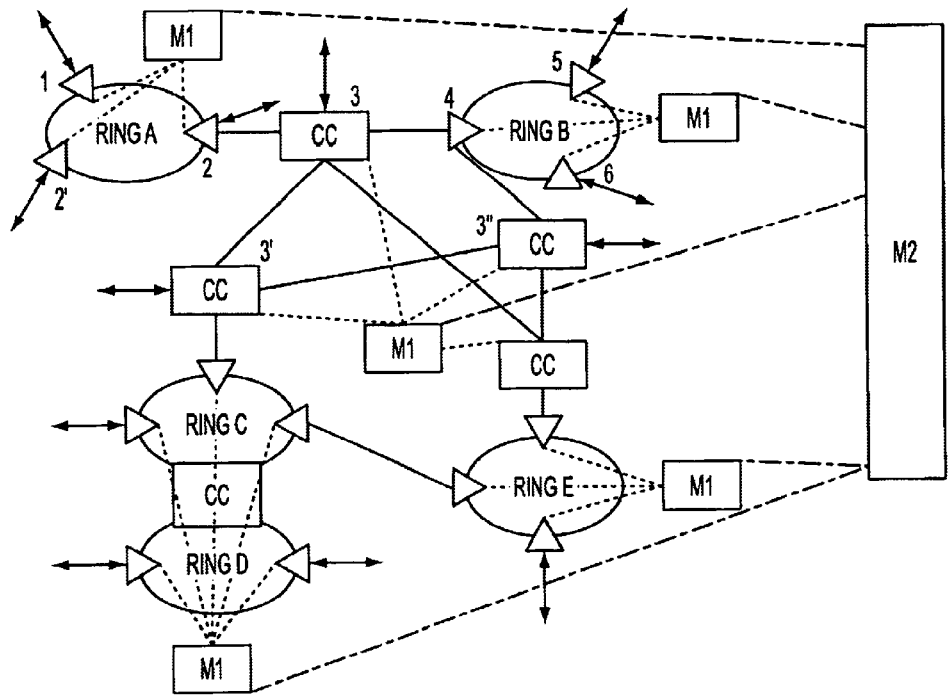
FIG. 1 shows a synchronous digital telecommunications network.

A synchronous digital telecommunication network usually is comprised of a number of different network elements such as Add/Drop Multiplexer (ADM) and Cross Connectors (CC) that are connected to a telecommunication network. The different network elements are controlled by several (for example, two) hierarchical management systems M1, M2. Such a telecommunication network is shown in FIG. 1. It is customary to connect several network elements into rings (Ring A-Ring E) or subnetworks. Several network elements of the same type in each ring or subnetwork are controlled by their own management system M1 of a lower hierarchy level while management system M2 of an upper hierarchy level is used for controlling management system M1 of the lower hierarchy level and for controlling the interaction of the individual rings and subnetworks. Connections between network elements are shown as solid lines, connections between management system M1 and the network elements are shown as dotted lines and connections between management systems M2 and management systems M1 are shown as dash-dotted lines. Double pointers identify the access points from which it is possible to access the network from the outside or on which messages that are to be transmitted are entered. Cross Connector systems are marked CC, Add/Drop Multiplexers are shown as triangles.

Management systems M1, M2 are responsible for configuring the network, for setting up and tearing down connections, for maintaining hardware and software and for handling exceptional situations. One of the basic principles of the invention is to set up connections without the participation of management systems M1, M2. The telecommunications network receives a request to set up a new connection and, using the method in accordance with the invention, looks for and finds a suitable path through the network and sets up the requested connection via this path. Information on a new connection set up in this manner can then be relayed to the management system.

Figure 2:
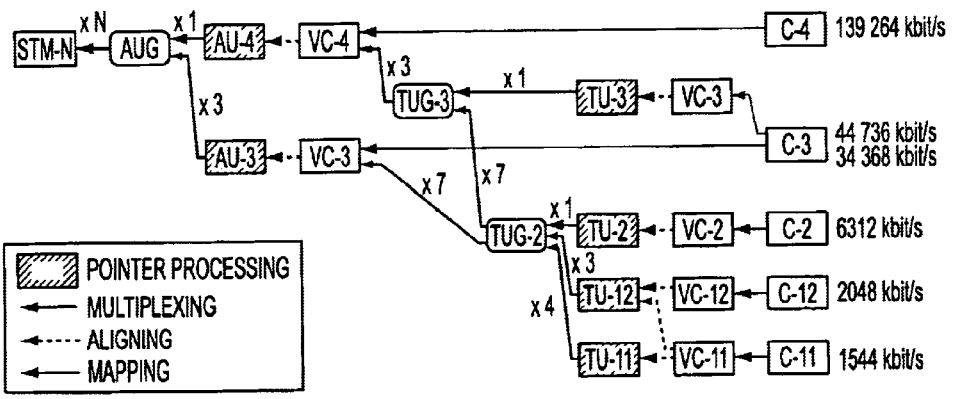
FIG. 2 shows a diagram with the multiplex structure of the telecommunications network.

A protocol is used in the telecommunications network based on which the network is logically structured into several multiplex layers. FIG. 2 shows a schematic view of the multiplex structure based on the protocol established for synchronous digital hierarchies (SDH) that is used in the exemplary embodiments. The basic transmission unit is a frame structure that is called synchronous transmission module STM-N. N represents one of the numbers 1, 4, 16 or a higher multiple of 4 and identifies the transmission capacity (size) of the transmission module. The exemplary embodiments only uses transmission modules with a size of STM-1. However, the invention can also be carried out with other transmission modules. The invention also is not limited to the multiplex structure of SDH, rather, it is possible to use any protocol for synchronous digital telecommunications networks with hierarchical multiplex structure such as the protocol for SONET (synchronous optical network), for example.

A STM-1 type transmission module can transmit a virtual VC-4 container. It is possible to pack three sub-units of type TUG-3 into this container with the TUG-3 sub-units in turn containing seven sub-units of the TUG-2 type. Due to this multiplex structure the telecommunications network is structured logically into the referenced multiplex layers STM-N, VC-4, TUG-3 and TUG-2. More information on this multiplex structure can be found in ITU-T Recommendation G.707 (3/96).

Figure 3:
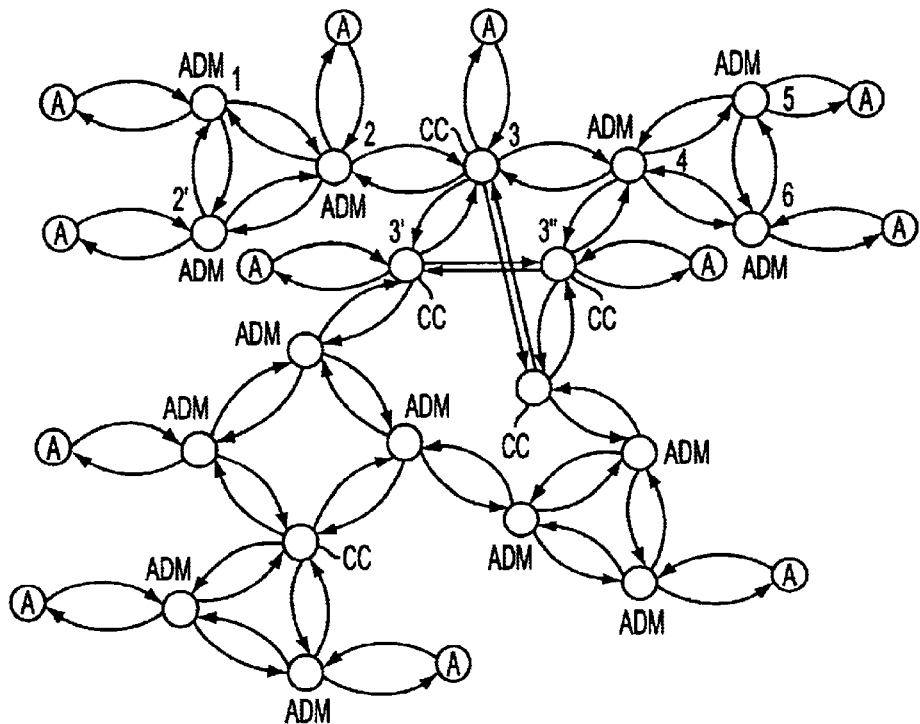
FIG. 3 shows a schematic view of existing connections of a first multiplex layer in the telecommunications network shown in FIG. 1.
Figure 4:
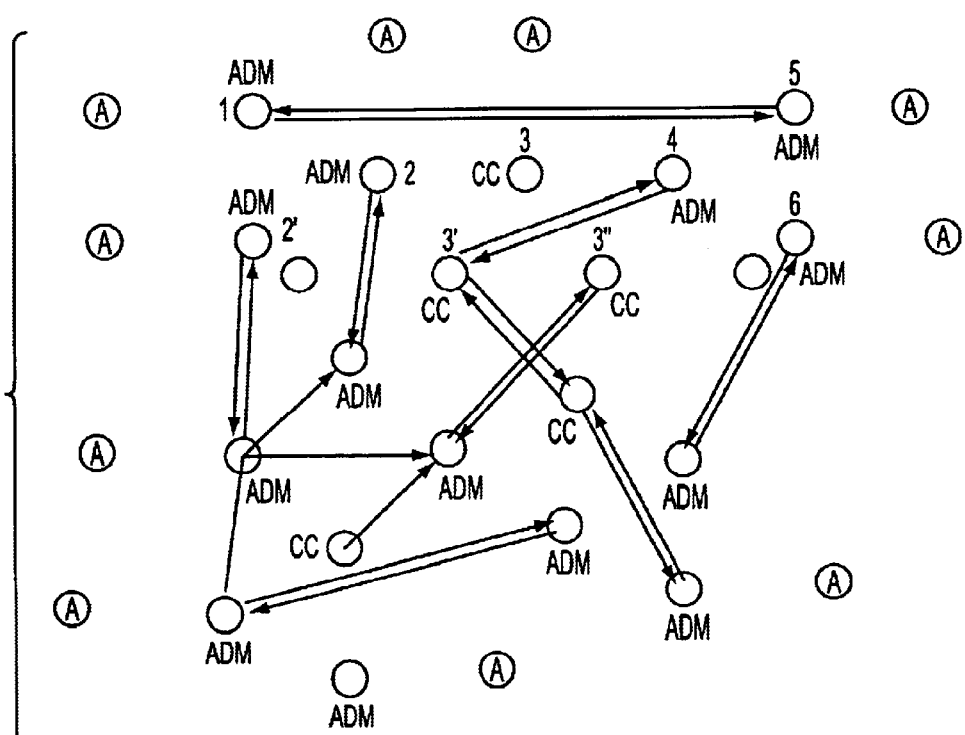
FIG. 4 shows a schematic view of existing connections of a second multiplex layer in the telecommunications network shown in FIG. 1.

The method in accordance with the invention is based on a model of the telecommunications network that will be explained in the following paragraphs with the help of the exemplary embodiments and FIGS. 3 and 4 as well as the described multiplex structure. FIGS. 3 and 4 show the same network as FIG. 1.

First, the direct, physical connections between the network elements in the model are described. These connections are presented as pointers in FIG. 3. These direct, physical connections are existing connections of the lowest multiplex layer STM-N. The letter A identifies the access points of the network that are shown as double pointers in FIG. 1. In FIG. 2, Add/Drop Multiplexers are called ADM, Cross Connectors are called CC. Since the direct, physical connections are bi-directional connections, a pointer is drawn into each direction between two connected network elements. The management systems of the telecommunications network are not shown in FIGS. 3 and 4.

Then, the logical connections between two network elements of the telecommunications network are considered. These are produced through connecting virtual containers VC-4 of network elements arranged between the two network elements. These logical connections are shown in FIG. 4. Such a through connection of sub-units of synchronous transmission modules usually is one of the tasks of the cross connectors. The logical connections shown in FIG. 3 are connections of the second multiplex layer VC-4. It is possible to draw graphs with the logical connections of higher multiplex layers TUG-3 and TUG-2 analogously. It also is possible to draw unidirectional connections, point-to-multipoint connections (broadcast connections) and protected connections, so-called subnetwork connection protection (SNCP) as pointers between their respective endpoints in the graphs.

This means that the model takes all existing connections between the network elements in all multiplex layers of the telecommunications network into account. It should be noted that a connection of a higher multiplex layer, for example, multiplex layer VC-4, presents a path in the next lower multiplex layer, for example, in multiplex layer STM-N. A path is a chain of individual connections. This means that there is a one-sided correlation between the multiplex layers from a higher multiplex layer to a lower layer, but not the other way around.

The connections that are taken into consideration in the model, i.e. all existing connections in all multiplex layers, will be called "arc" in the subsequent paragraphs. It is possible to calculate a free transmission capacity for each arc as the difference between the entire transmission capacity of an arc that is determined in the ITU-T Recommendations G.707 (3/96) for the respective multiplex layers and the current load of the arc. If all graphs are now superimposed on each other and if the free transmission capacity of each individual arc is taken into consideration, the result is a multi-layer graph that reflects all currently possible paths in the telecommunications network in all multiplex layers.

Another basic principle of the invention is based on this model and stipulates sending a broadcast from a sending network element to all other network elements in order to identify possible paths for a connection between the sending network element and a selected network element. This broadcast is to be transmitted via existing connections of all multiplex layers that can be used for setting up the connection and that have sufficient free capacity. In accordance with the invention, all network elements that receive the broadcast check for at least a part of the outputs of the respective network elements in all multiplex layers that can be used for setting up the connection to which the respective network element has access to see whether there is sufficient free transmission capacity, i.e., each network element checks the arcs that it terminates for free transmission capacity. The broadcast then is relayed by the respective network elements via suitable arcs. If a broadcast reaches the selected network element, a possible path is identified.

Figure 5:
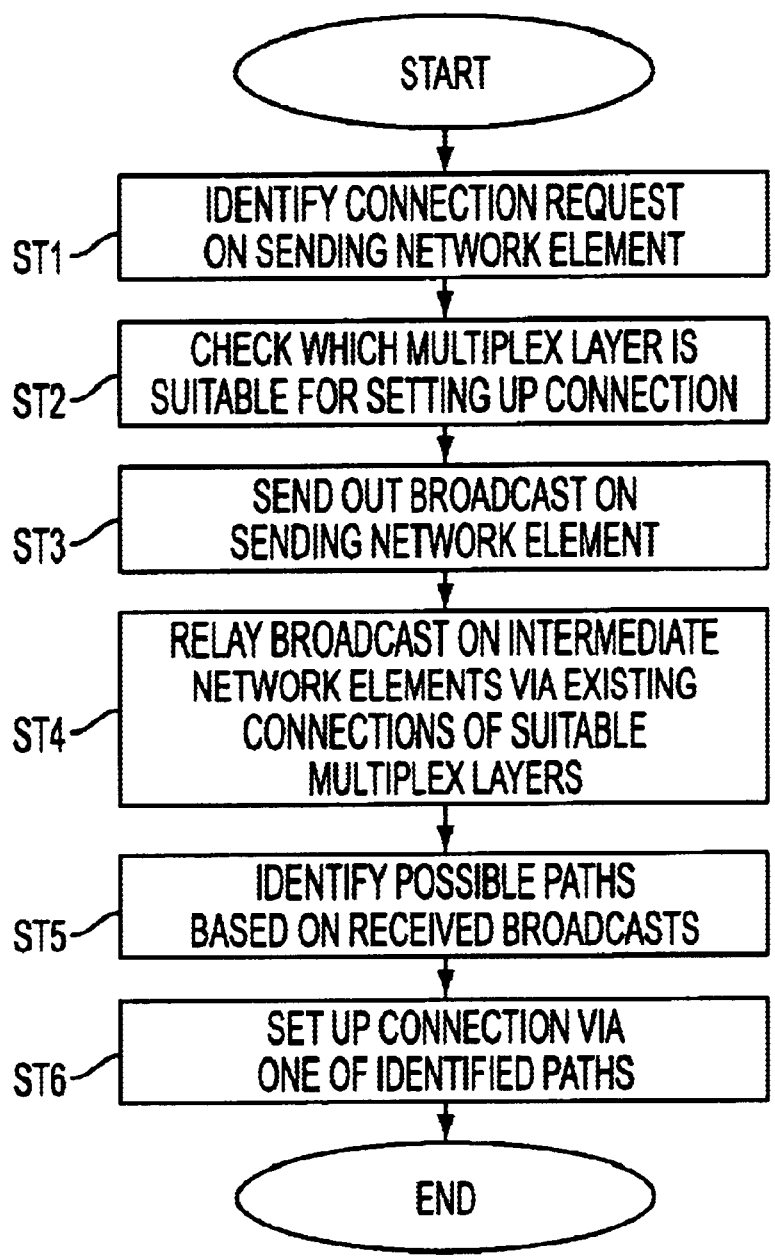
FIG. 5 shows a flowchart of the method in accordance with the invention in the first exemplary embodiment and FIG. 6 shows a flowchart of an especially preferred embodiment of the invention of a second exemplary embodiment.

In the following paragraphs, the method in accordance with the invention is described in more details with the help of FIG. 5 in a first exemplary embodiment. In a first step ST1 a connection request to a network element is identified. This makes this network element the sending element; the network element to which the connection is to be set up becomes the selected network element. In a second step ST2, the sending element then checks which of the multiplex layers is suitable for the connection that is to be set up. In doing so, there is a comparison between how much transmission capacity is needed for the connection that is to be set up and how much transmission capacity a container or a transmission module makes available to the respective multiplex layer.

In a third step ST3, the sending network element sends a broadcast to all other network elements of the telecommunications network.

Connection information is advantageously transmitted in the broadcast that indicates which of the multiplex layers is suitable for setting up the connection. This can be done, for example, by indicating in the broadcast the transmission capacity that is required for setting up the connection. The broadcast is sent out via all existing connections of all connections of all multiplex layers to which the sending network element has access and that are suitable for setting up the connection and have sufficient free transmission capacity, i.e., it is transmitted via all arcs that the sending network element terminates and that have sufficient free transmission capacity. The fact that the broadcast is sent to all other network elements does not mean that all remaining network elements received the broadcast. Rather, this means that the target address is not a certain network element, but the target address is: "to all".

In a fourth step ST4, the network elements that receive the broadcast relay it via suitable arcs. Again it is possible to check in each received network element for each suitable multiplex layer on each output whether there is a path with free transmission capacity. It is advantageous to send the broadcast only via such paths. There can also be stipulations that all or only certain broadcasts are not to be relayed via certain outputs or arcs. It also is advantageous, based on another criterion such as a routing table stored in the network element, not to relay the broadcast via certain arcs. For example, the routing table can stipulate that a broadcast with a certain target address need not be relayed via certain arcs since it is not possible to find any paths to the selected network element via these arcs because the arc leads away from the target.

In this manner, the broadcast is relayed via different paths in the telecommunications network. If the broadcast reaches the selected network element via a first path, this first path is identified as suitable for setting up the connection. The selected network element can now start a timer and, for the time period stipulated, can wait for additional broadcasts that are transmitted via different paths. Once this time period has expired, one of the paths that was identified as suitable for setting up the connection is selected in a fifth step ST5. In a sixth step ST6, the desired connection then is set up via the selected path. This is done advantageously from the selected network element.

In an advantageous continuation of the invention, a cost parameter is transmitted in the broadcast. Each network element that relays the broadcast calculates the respective connection costs and adds them to the cost parameter. Based on this cost parameter the selected network element can then decide which one of the identified paths is the most inexpensive path and can then select it. The connection costs are calculated based on the current usage of the connections and network elements. An arc that only has little free transmission capacity is more expensive than a free or almost free arc. An arc that is used to capacity receives the value infinity as cost parameter. It also is possible to use additional criteria for calculating the cost parameter, such as the number of the network elements that lie on the path or a load distribution within the network that the network supplier desires.

Figure 6:
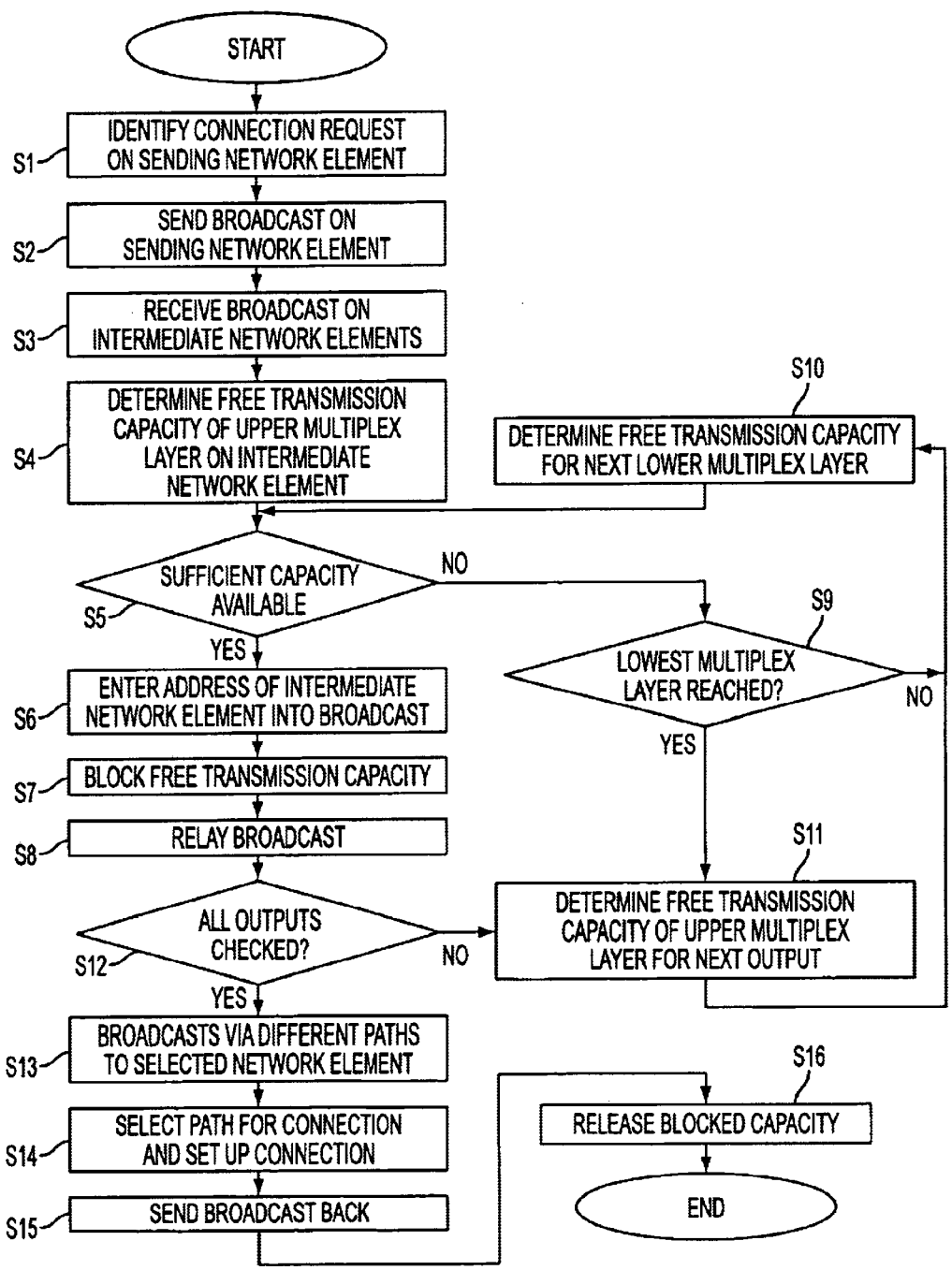

In the following paragraphs, an especially preferred embodiment of the method in accordance with the invention is shown in a second exemplary embodiment based on the first exemplary embodiment and using the flowchart in FIG. 6. To this end only the two lowest multiplex layers STM-N and VC-4 are considered in the second exemplary embodiment. However, the process is analogous for the higher multiplex layers TUG-3 and TUG-2.

Step S1: A connection request is identified on any network element of the telecommunications network. The request can be the request of a subscriber, or it can be caused by a failed connection. Another possibility for the connection request could be that a network element determines a bottleneck during the transmission via an existing connection and requests a second connection that is parallel to the existing connection. The network element, on which the connection request is identified, now becomes the sending network element. In the exemplary embodiment this is the network element identified as 1, an Add/Drop Multiplexer. The network element to which the connection is to be set up becomes the selected network element, identified with 6 in the exemplary embodiment.

Step S2: The sending network element 1 just like in the first exemplary embodiment now checks which multiplex layers are suitable for the connection that is to be set up and sends a broadcast to all other network elements via all arcs that it terminates and that have sufficient free transmission capacity. This means in the exemplary embodiment broadcasts are transmitted to network elements 2, 2' in the first multiplex layer STM-N and to network element 5 in the second multiplex layer VC-4.

Step S3: The broadcast is received at network elements 2, 2' and 5. These network elements are called intermediate network elements since they are located on a possible path to the selected network element. The following steps are described as an example for network element 2 but are carried out on all network elements that receive the broadcast.

Steps S4 and S5: Network element 2 that receives the broadcast now checks different arcs that it terminates for sufficient free transmission capacity whereby sufficient means that there should be enough free transmission capacity to set up the requested connection. To this end the free transmission capacity for an arc is determined in steps 4 and 5 and determines whether it is sufficient for setting up the desired connection. This checking process advantageously starts on the upper multiplex layer and is interrupted for an output as soon as a suitable arc is detected. This prevents the formation of loops in the network. An alternative is to check all arcs that the respective network element terminates for free transmission capacity.

Step S6: Each network element has a unique address. Once network element 2 finds an arc with sufficient free transmission capacity, it enters its address into a list that is contained in the broadcast. This is advantageous since this ensures that each broadcast contains the path via which it was transmitted. This means the broadcast itself contains the necessary information to set up a connection via the respective path.

Step S7: The free transmission capacity or at least the share of the free transmission capacity that is required for setting up the connection now is blocked on network element 2. This is advantageous in that this ensures that the required transmission capacity continues to be available for the possible set-up of the desired connection and is not used for a different purpose in the meantime.

Step S8: Now network element 2 relays the broadcast via the arc that was determined to be suitable; in the exemplary embodiment to network node 2' and 3. Steps S3 through S8 (or even S9 through S12) are carried out again.

Step S9: If no arc with free capacity is found for an upper multiplex layer in step S5, a process checks whether there is a lower multiplex layer that is suitable for setting up the connection. If this is not the case step S11 continues and checks the next output until all arcs that are suitable as outputs of network element 2 are checked in step S12.

Step S10: If the lowest multiplex layer has not yet been reached, the next lower layer is used by determining the free transmission capacity of the existing connections of this multiplex layer in order to continue with step S5 again.

In accordance with steps S3 through S12 the broadcast is received on all intermediate network elements and relayed via suitable arcs. This causes the broadcast to reach the selected network element 6 via different paths. Possible paths are 1-2-3-45-6, 1-2'-2-3-3'-3"-4-5-6 or 1-5-6. The following steps now are carried out on the selected network element 6:

Step S13: The broadcast is received via the different paths. These paths now are identified as paths suitable for setting up the connection.

Step S14: Out of these paths one path is selected for setting up the connection. The selection can be based on the above-mentioned cost parameter. Then the connection is set up. The set-up can be such that a message is send via the selected path to the intermediate network elements, e.g. network elements 6 and 5, with the command to through connect the desired connection.

Step S15: Now the broadcast is being sent back. This is advantageous since this informs all network elements that a path was selected and the connection was set up. All other network elements now release the transmission capacity that was blocked in step S16. An alternative is to release the blocked transmission capacity after a preset time period. The broadcast that is being sent back can also be used to initiate the set-up of the connection via the selected path since the broadcast, as already mentioned, contains all information necessary for setting up the connection.

In another advantageous embodiment of the invention each broadcast has a unique transaction number. If a network that already relayed a first broadcast receives another broadcast with the same transaction number, it can deal with it in two ways: it can either discard the second broadcast if its cost parameter is higher than the cost parameter of the first broadcast or it releases the transmission capacity it blocked based on the first broadcast and relays the second broadcast and blocks the transmission capacity on the path that is used for relaying the broadcast, provided the cost parameter of the first broadcast is higher than the cost parameter of the second one. This process effectively prevents the formation of loops.

The following paragraphs describe a protocol that can be used for signaling between the network elements of the telecommunications network for carrying out the method in accordance with the invention. It determines the type of the broadcast that is exchanged between the network elements. The broadcast has the following form:

Broadcast=(TransactionIndex; MessageType; SourceNode; DestinationNode;
ConnectionType; ArcListOfPath; PathCost), whereby the individual fields of the broadcast have the following meaning:

TransactionIndex: Unique transaction number of the broadcast;

MessageType: Type and purpose of the broadcast; in this case broadcast for setting up a connection;

SourceNode: Address of the sending network node;

DestinationNode: Address of the selected network node;

ConnectionType: Type of the connection that is to be set up and required transmission capacity;

ArcListOjPath: List into which each relaying network element enters its address before it relays the broadcast;

PathCost: Cost parameter of the path via which the broadcast is transmitted.

The broadcast preferably is transmitted in the so-called DCC, a service channel set up for SDH networks as byte in the header information of SDH frames.

The second broadcast that the selected network element sends back is set in MessageType=DeBlockPorts in order to indicate that the purpose of the second broadcast is to release the blocked transmission capacity. This blocking in the network elements is associated with a unique process number, the transaction number, and is identical in the first and second broadcast.

If a network element discards a received broadcast, for example, because a broadcast with the same transaction number and a lower cost parameter was already received and processed, it is advantageous to first send back the broadcast that is to be discarded with MessageType=DeBlockPorts. This releases any blocked transmission capacities as quickly as possible.

A special advantage of the method in accordance with the invention is the fact that it is possible to restrict the multiplex layers admitted to the search for a new path. This could be of interest for setting up virtual private networks. This would allow a network provider to offer his customers a virtual network that the customer could configure independently on multiplex layers TUG-2 and TUG-3, for example. However, the customer does not have any access to the lower multiplex layers. The customer has a transparent network that he can configure based on his own needs. The network provider no longer needs to accommodate the customer's configuration needs and wishes.

A network element that is suitable for carrying out the method in accordance with the invention has the following devices:

means for identifying a connection request;

means for checking which one of the multiplex layers is suitable for setting up the connection;

means for determining free transmission capacity for existing connections of the suitable multiplex layers;

means for sending the broadcast and means for relaying a received broadcast.

The network element can be comprised of a software-controlled device whose operation is controlled by a microprocessor that carries out an operating system. In this case the individual means can be program modules of the operating system.

The network element advantageously contains a processor that is responsible for carrying out the connection requests and a memory that is assigned to this processor. This means that these processor processes all broadcasts and messages that are related to the set-up of the connections. The processor knows all connections that are related to a network element, i.e. all arcs that the network element terminates. Based on the existing connections it is possible to calculate possible paths from the point of view of the network element with the help of a corresponding software module. If, for example, there is no usable VC-4 with free transmission capacity for setting up a connection, one is being reserved and is set up when the connection is set up. The process advantageously has direct access to the communications channels of the network element.

It is especially advantageous if the processor compiles a list of the possible, continuing paths that is based on the information it receives through the broadcasts. Such a list is called routing table. On request, i.e. when there is a request for connection or when a broadcast is received, it must only read the list from memory and in this manner receives information via which arcs a broadcast must be sent or relayed. Such a routing table can also be compiled, updated and distributed via a management system. It also is possible for the network elements to exchange and merge routing tables.

What is claimed is:

1. A method for setting up a connection between a sending network element and a selected network element of a digital, synchronous telecommunications network wherein possible paths with free transmission capacity between the sending network element and the selected network element are identified using a broadcast that is being sent by the sending network element to all other network elements and whereby the connection is subsequently set up via one of the identified paths said method comprising the steps of:

logically structuring the telecommunications network in at least two multiplex layers based on a hierarchy and in accordance with the protocol used in the telecommunications network with each network element having access to at least one part of the multiplex layers checking each of the logical multiplex layers to determine which of the multiplex layers is suitable for setting up the connection, and relaying the broadcasting via existing connections of the suitable multiplex layers to which the respective relaying network element has access.

2. A method in accordance with claim 1 in which the network elements that receive the broadcast check on at least one part of their outputs for the suitable multiplex layers which they can access to see if there is a path with free transmission capacity and only relay the broadcast via such paths.

3. A method in accordance with either claim 1 or 2 in which the broadcast is relayed based on an additional criterion via part of the existing connections of the suitable multiplex layers.

4. A method in accordance with claim 3 in which the additional criterion is a routing table that is stored in the relaying network element.

5. A method in accordance with claim 1 in which connection information is transmitted in the broadcast that discloses which of the multiplex layers is suitable for setting up the connection.

6. A method in accordance with claim 1 in which the process that checks whether a path with free transmission capacity exists is carried out in the reverse order of the hierarchy and in which the checking process per output is interrupted as soon as a path with sufficient free transmission capacity is found.

7. A method in accordance with claim 1 in which each individual network element has a unique address and in which each broadcast contains a list into which the remaining network elements enter their address before they relay the broadcast.

8. A method in accordance with claim 1 in which the network elements that relay the broadcast block the transmission capacity of the outputs in the multiplex level in which they relay the broadcast.

9. A method in accordance with claim 8 in which, following the connection set-up, the selected network element sends a second broadcast to all other network elements and in which the other network elements release the blocked transmission capacity after receiving the second broadcast.

10. A method in accordance with claim 1 in which a cost parameter is calculated based on the free transmission capacity of the respective path and in which the cost parameter is transmitted together with the broadcast.

11. A method in accordance with claim 10 in which the selected network element decides, based on the cost parameter, which of the identified paths is to be used for setting up the connection.

12. A method in accordance with claim 1 in which each broadcast contains a unique transaction number.

13. A method in accordance with claim 10 in which each broadcast contains a unique transaction number and in which a network element that relays a first broadcast stores the unique transaction number and the cost parameter of the first broadcast and in which another broadcast with the same transaction number is relayed only if the cost parameter of the additional broadcast is lower than the cost parameter of the first broadcast and, if this is not the case, in which the additional broadcast is discarded.

14. A method in accordance with claim 1 in which a connection is set up based on a user request.

15. A method in accordance with claim 1 in which a central management system is informed of a newly set up connection.

16. A network element for carrying out a method for setting up a connection between a sending network element and a selected network element of a digital, synchronous telecommunications network wherein possible paths with free transmission capacity between the sending network element and the selected network element are identified using a broadcast that is being sent by the sending network element to all other network elements and whereby the connection is subsequently set up via one of the identified paths, said method comprising the steps of: logically structuring the telecommunications network in at least two multiplex layers based on a hierarchy and in accordance with the protocol used in the telecommunications network with each network element having access to at least one part of the multiplex layers; checking each of the logical multiplex layers to determine which of the multiplex layers is suitable for setting up the connection; and relaying the broadcasting via existing connections of the suitable multiplex layers to which the respective relaying network element has access, said network element comprising:

means for identifying a connection request, means for checking each of the logical multiplex layers to determine which one of the multiplex layers is suitable for setting up the connection, means for determining free transmission capacity for existing connections of the suitable multiplex layers, means for sending the broadcast and means for relaying a received broadcast.

* * * * *